United States Patent [19]

Klein

[11] 3,981,855

[45] Sept. 21, 1976

[54] REACTOR PROCESS CONDITIONS CONTROL

[75] Inventor: Max Klein, New Shrewsbury, N.J.

[73] Assignee: Normac, Inc., Tinton Falls, N.J.

[22] Filed: June 26, 1972

[21] Appl. No.: 266,469

Related U.S. Application Data

[63] Continuation-in-part of Ser. No. 814,879, March 19, 1969, abandoned, which is a continuation-in-part of Ser. No. 601,148, Dec. 12, 1966, abandoned, which is a continuation-in-part of Ser. No. 460,187, June 1, 1965, abandoned, and a continuation-in-part of Ser. No. 218,596, Jan. 17, 1972, Pat. No. 3,880,771, which is a continuation-in-part of Ser. No. 700,704, Jan. 26, 1968, abandoned, and a continuation-in-part of Ser. No. 106,915, Jan. 15, 1971, abandoned, which is a continuation-in-part of Ser. No. 889,332, Dec. 31, 1969, abandoned, which is a continuation-in-part of Ser. No. 515,445, Dec. 21, 1965, abandoned, and a continuation-in-part of Ser. No. 15,935, March 2, 1970, abandoned, which is a continuation-in-part of Ser. No. 488,756, Sept. 20, 1965, abandoned.

[52] U.S. Cl. .................................. 526/63; 23/286; 134/38; 260/2.3; 260/23 AR; 260/42.52; 260/42.53; 260/95 R; 428/514; 526/64; 526/88; 526/346; 526/351; 526/344

[51] Int. Cl.² .................... B01J 1/00; B08B 13/00; C08F 2/00

[58] Field of Search .......... 260/80 M, 80.81, 85.5 P, 260/86.1 N, 93.5 W, 93.7, 94.9 P, 95 R, 2.3; 134/38; 23/286

[56] References Cited

UNITED STATES PATENTS

| | | | |
|---|---|---|---|
| 2,715,117 | 8/1955 | Baeyaert | 260/92.8 |
| 2,745,823 | 5/1956 | Hewitt | 260/83.7 |
| 2,927,006 | 3/1960 | Brooks | 23/252 |
| 3,188,306 | 6/1965 | Porter | 260/94.9 |
| 3,210,163 | 10/1965 | Hommaerts | 23/285 |
| 3,538,067 | 11/1970 | Bognar | 260/92.8 |

*Primary Examiner*—Stanford M. Levin

[57] ABSTRACT

Disclosed is a method of conducting under selected temperature conditions and with agitation a chemical operation which requires agitating a liquid phase under selected conditions, by enclosing the involved starting materials in a liquid-tightly enclosed cylindrical operating zone by a zone-enclosure that is a heat conductor and is of greater length than diameter and is enveloped by a subdivided temperature-control fluid-confining zone, and agitating the operating zone contents by rotating the operating zone with the fluid-confining zone while feeding temperature-control fluid through the temperature-control zone. Also enclosed is the apparatus that provides the cylindrical operating zone enveloped by the temperature-control zone.

8 Claims, 9 Drawing Figures

INVENTOR.
MAX KLEIN
BY A. A. Olinger
ATTORNEY

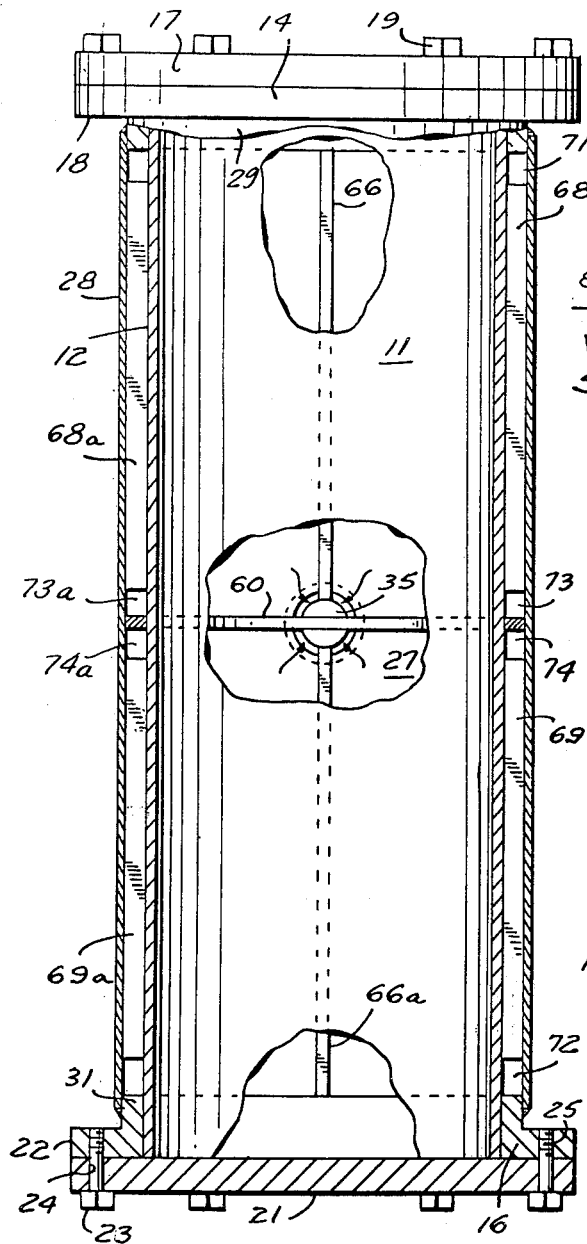
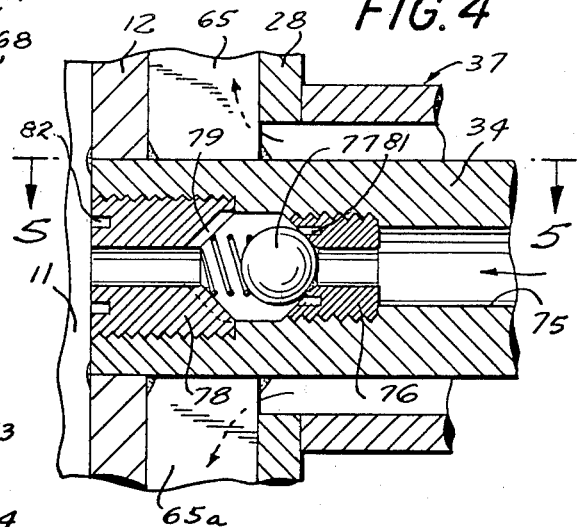
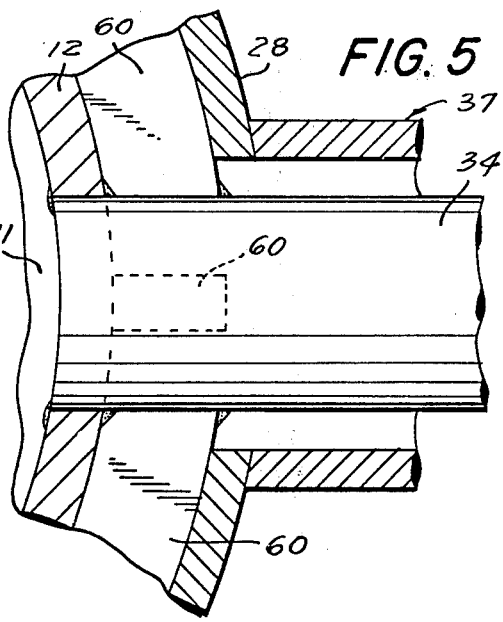
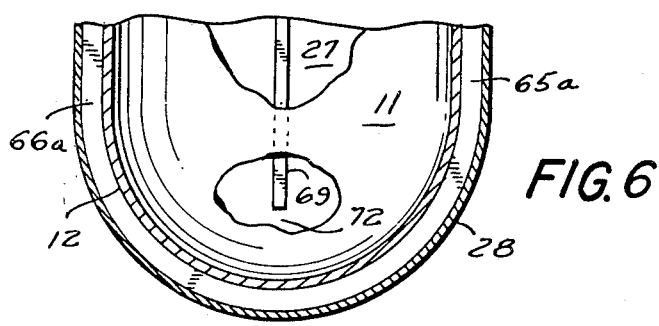

REACTOR PROCESS CONDITIONS CONTROL

This application is a continuation-in-part of my (i) copending application Ser. No. 814,879 filed Mar. 19, 1969, which in turn is a continuation-in-part of my then copending application Ser. No. 601,148 filed Dec. 12, 1966, which latter application in turn is a continuation-in-part of my then copending with it application Ser. No. 460,187 filed June 1, 1965, (ii) copending application Ser. No. 218,596 filed Jan. 17, 1972 which in turn is a continuation-in-part of my then pending application Ser. No. 700,704 filed Jan. 26, 1968, (iii) copending application Ser. No. 106,915 filed Jan. 15, 1971 which in turn is a continuation-in-part of my then pending application Ser. No. 889,332 filed on Dec. 31, 1969, which application No. 889,332 was a continuation-in-part of my then pending application Ser. No. 515,445 filed Dec. 21, 1965, and (iv) copending application Ser. No. 15,935 filed Mar. 2, 1970, which in turn is a continuation-in-part of my then pending application Ser. No. 488,756 filed Sept. 20, 1965. All of said earlier filed applications except Ser. No. 218,596, now U.S. Pat. No. 3,880,771, now are abandoned.

This invention in part is that of a materials-treating apparatus embracing a temperature-controllable reactor, such as a pressure reactor as an autoclave, rotatable end over end about an axis normally transverse to its central axis and generally about midway of its ends. This apparatus is equipped with heat-control (i.e. heating or cooling) means for providing substantially overall uniform temperature through the treating chamber walls into its interior, and can include means enabling charging fluid material into the interior during operation.

Also part of the invention is a method of conducting under selected temperature conditions and with agitation a chemical operation that has to be carried out with agitation under such temperature conditions, by enclosing the materials thus to be treated in a liquid-tightly enclosed operating zone substantially completely enveloped by a temperature-control fluid-confining zone, both of which zones are provided by the apparatus of the invention, and agitating the operating zone contents by rotating the apparatus to rotate the operating zone while running temperature-control fluid through the temperature-control zone to provide substantially uniform overall indirect heat transfer to the operating zone contents.

The treating apparatus or rector of the invention can serve also as an end over end rotatable ball mill with or without pressure application and similarly as to heating or cooling control and/or fluid material during operation charging means, and having exceptional advantages over former ball mills rotatable about the control axis.

An important feature of the invention is its steady provision of uniform overall temperature throughout its end over end rotation during its operation.

Another feature of the apparatus of the invention is its avoidance of undesirable gas or vapor lock development in the heat-control means, which otherwise would prevent the provision of uniform temperature.

A further feature of the apparatus is that in its use as a pressure reactor or autoclave, its end over end rotation provides the necessary agitation thereby eliminating the need not only for an internal shaft-driven agitator but also for a stuffing-box where such shaft enters an autoclave. Such stuffing-box has been a source of serious disadvantages because of its wear, leakage, maintenance and replacement cost, and limitation on the applicable pressures.

Still another feature of one embodiment of the apparatus is its inclusion of means to enable feeding or, and even also, withdrawing liquid or other fluid materials into the reactor while it is rotating and even under superatmospheric internal pressure.

Other features of the invention will be seen from its further description below.

Broadly considered, the apparatus of the invention comprises (a) a fluid-tightly closeable materials-treating or reaction chamber with at least its body portion substantially completely enclosed by a temperature-control fluid chamber provided by its being surrounded by a temperature-control fluid jacket, (b) means to rotate the jacketed chamber end over end about an axis substantially normally transverse to its central axis, (c) divider-baffling means dividing its temperature-control fluid chamber into a plurality of, such as four, substantially similar and independent control-fluid compartments or quadrants, (d) temperature-control fluid ingress means which enable feeding temperature-control fluid into such quadrant while the reactor is egress (e) means in each compartment or quadrant to affect the flow of fluids through it to provide substantially uniform overall heat transfer from each of them; and (f) fluid agress means to enable discharging heat-control fluid from these compartments during the rotation.

The apparatus of the invention can be understood more readily from the following detailed description of certain embodiments of it, with reference to the accompanying drawings, wherein:

FIG. 3 is a vertical sectional view taken along the line 3—3 of FIG. 1 looking in the direction of the arrows, with parts in side elevation and parts of its inner shell or reaction chamber wall broken away to expose baffles between it and the outer wall or shell;

FIG. 4 is a fragmentary vertical sectional view showing the inner end of a modified form of jacketed shaft with an axially central bore running through it to serve as a fluid materials conduit communicating with the interior of the reaction chamber;

FIG. 5 is a fragmentary partially sectional view taken along line 5—5 of FIG. 4 looking in the direction of the arrows, and with the central bore and parts of the valve within its inner end not shown;

FIG. 6 is a fragmentary vertical section of the lower end of a modified form of the apparatus of FIG. 1, with parts of the reaction chamber wall broken away to show the baffle in that part of the heating chamber;

Figure 1:
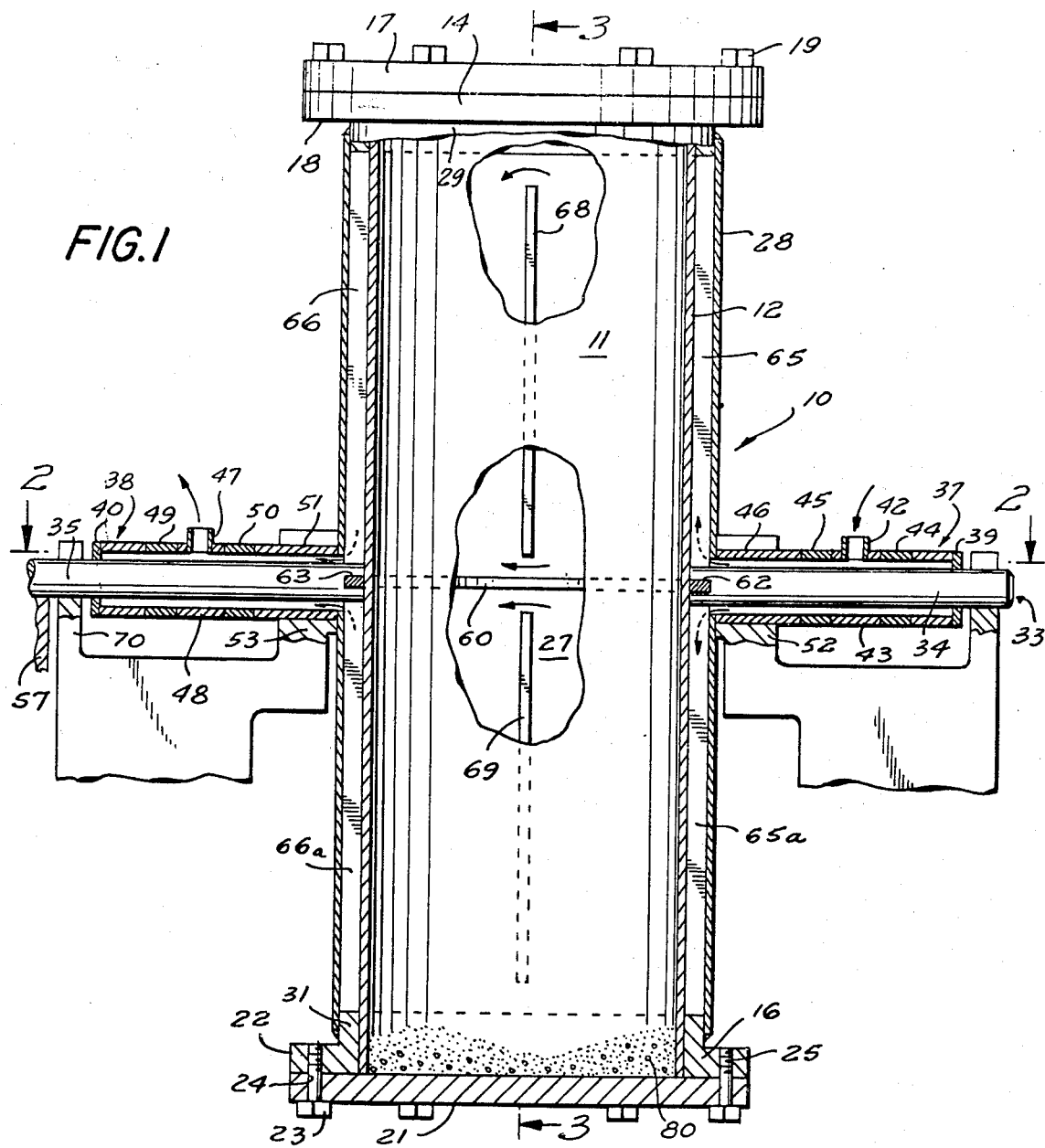
FIG. 1 is a sectional view of one embodiment of the apparatus with the axis of its cylindrical reaction chamber vertical, and taken in a plane through that axis and the axis of the shaft about which the chamber is to be rotated; with parts shown in front elevation and parts of its inner shell or reaction chamber wall broken away to expose baffles in the temperature-control fluid chamber.

The rotating materials-treating apparatus 10, e.g. reactor-autoclave or ball mill, of the invention, has (as FIGS. 1–3 and 6 show) its treating zone or reaction chamber 11 enclosed by the inner shell or cylindrical reaction chamber wall 12 with one outer end (upper as in FIGS. 1 and 3) tightly fitted into the inner circular wall of the circular opening of upper collar 14. The other end (lower as in the drawings) similarly is tightly fitted into the circular wall of the circular opening in lower collar 16.

The reaction chamber is pressure-tightly closed by the upper cap 17 removably secured to the outwardly extending annular flange 18 of collar 14 by tightly securing means such as a sufficient number, e.g. 24, of securing bolts 19 extending through equally spaced apart bolt holes in cap 17 and with their threaded ends tightly engaged in registry with the inner threads of correspondingly located bolt holes in flange 18.

The lower end of chamber 11 similarly is closed off by corresponding lower cap 21 similarly secured to outwardly extending annular flange 22 of lower collar 16 by a corresponding series of bolts 23 extending through bolt holes 24 in cap 21, with their threaded outer ends tightly engaged in registry with the inner threads of the corresponding bolt holes 25 in flange 22.

Wall 12 of treating zone 11 is encircled by a temperature-control fluid chamber 27 enclosed between that wall and temperature-control fluid chamber outer wall 28. The inner surfaces of the outer ends of wall 28, are pressure-tightly fitted over respectively the outer peripheral surface of annularly depending skirt 29 of collar 14 and the corresponding peripheral surface of upwardly extending annular skirt 31 of lower collar 16. Those outer ends of wall 28 are fluid-tightly sealed by suitable means such as welding the circular part of each of them to the corresponding peripheral surface of each of skirt 29 and skirt 31.

To enable rotating the reactor-autoclave or ball mill end over end, apparatus 10 (of FIGS. 1–6) is supported from bearings by sleeves about two rotatable diametrically opposed parts of a shaft 33 positioned with its axis of rotation running through the apparatus in a line substantially normally transversely to intersect the central axis.

Each of these two separate parts 34 and 35 (FIG. 1) of shaft 33 has its inner end integrally attached (as by welding) to diametrically opposed locations longitudinally about midway along wall 12 of reaction chamber 11. Each such shaft part is enclosed in and spaced away from its own respective temperature-control fluid sleeve 37 and 38 communicating with temperature-control fluid chamber 27. The outer end of each of these shaft-part sleeves or sleeve-jackets is liquid-tightly sealed off by its respective end or closure cap 39 and 40 with the outer end of each of shaft parts 34 and 35 respectively protruding in fluid-tight relationship (as by welding around their junction) through its respective cap. The inner end of each sleeve is integrally attached (as by welding) to jacket outer wall 28.

Temperature-control fluid inlet 42 of stationary T-fitting 43 is mounted between two rotary unions 44 and 45 in shaft-part sleeve-jacket 37. Union 44 pressure-tightly communicates between the T-fitting and the sealed off end of sleeve-jacket 37. Rotary union 45 similarly is connected between the T-fitting and inner end nipple 46, by which sleeve-jacket 37 is fluid-tightly and integrally attached to fluid chamber jacket 28. Sleeve-jacket 37 thereby communicates with chamber 27.

On the other shaft-portion jacket 38, temperature-control fluid leaves it through outlet 47 in stationary T-fitting 48 similarly mounted between two rotary unions 49 and 50. Rotary union 50 similarly is connected between T-fitting 48 and a second inner end nipple 51, by which shaft-portion jacket 38 is anchored to fluid chamber jacket 28 and communicates with chamber 27.

The rotary unions should be such as stand up under the operating temperatures and pressures. Found to be very effective with this apparatus used as a rotating autoclave is the swivel joint illustrated (in cutaway) on the front cover (page 1) of the OPW Division of Dover Corporation, Cincinnati, Ohio, catalog and again on its page 3 which gives some detail illustrations and description and features of this rotary union. Other illustrations and more information on other models appear on page 9 of that catalog. Its page 2 shows that its models with stainless steel body, as used in this apparatus, are rated for pressures up to 1,000 psi (lbs. per square inch), and those with ductile iron body are rated for up to 600 psi. Its page 12 give pressure and temperature ranges graphs for them for their different body metals. Its page 15 lists over 200 gases, and inorganic and organic liquids and solutions with which they can be used.

Apparatus 10 is mounted for rotation by rotatably supporting the diametrically opposed sleeve-nipples 46 and 51 in bearings 52 and 53 respectively. However, when the apparatus is of such size or the strength of sleeves 46 and 51 and wall 28 are such that reinforcement is advisable, these sleeves can be reinforced by enclosing each of them in a separate trunion (not shown) snugly fitted over it and with the periphery of the inner end of such trunion welded to jacket wall 28.

It is advantageous also to support the outer end of each shaft part 34 and 35 in a bearing which conveniently can be branch arms 70 and 70a of bearings 52 and 53. A pulley 57 is mounted at the outer end of shaft part 35, and for any larger size and heavier apparatus may be replaced by a sprocket or gear wheel to be driven by a chain belt, for rotating the apparatus.

To distribute uniformly the temperature-control fluid to enable providing overall substantially uniform temperature through the entire treating or reaction chamber wall 12, temperature-control fluid chamber 27 is divided into four substantially similar quadrantal parts or quadrants. First chamber 27 is divided into approximately equal upper and lower halves by annular or peripheral baffle 60 encircling reaction chamber wall 12 and extending from it to temperature-control fluid chamber wall 28 in substantially fluid-tight engagement with them is a plane substantially normally transverse to the central axis of chamber 11 and running substantially through the axis of shaft 33.

In this modification, annular or transverse baffle 60 passes at diametrically opposed locations through corresponding slots 62 and 63 in the inner ends of shaft portions 34 and 35 respectively.

Each of these upper and lower halves of temperature-control fluid chamber 27 then separately can be divided into substantially equal parts of quadrants (as seen in FIG. 1) by (i) the vertical divider baffles 65 and 65a extending in substantially fluid-tight engagement with chamber wall 12 and jacket wall 28 and between shaft part 34 and skirts 29 and 31 respectively and (ii) divider baffles 66 and 66a in like engagement between walls 12 and 28 and shaft part 35 and skirts 29 and 31.

To provide overall substantially uniform temperature distribution through the entire chamber wall 12, each such quadrantal portion of quadrant of temperature-control fluid chamber 27 includes at least one vertical and outer end shortened flow diverter baffle 68 as in the upper rear quadrant and like baffle 69 as in the lower rear quadrant (both as seen in FIG. 1), to promote serpentine stream flow of fluid separately in each of these quadrants. Each such short diverter baffle, as well as like baffles 68a and 69a (in the upper and lower front quadrants respectively, as seen in FIG. 3), extends also in liquid tight engagement from reactor chamber wall 12 to fluid chamber wall 28.

However, at its outer end (i.e. nearer a cap), each diverter baffle is cut off sufficiently to allow the stream flowing through its quadrant to pass almost completely and so extends, for example, roughly about 20% of the height of its quadrant short of cap 17 to provide a slot-like passage 71 (FIG. 3) through which fluid can pass from one half (in FIG. 1 the right hand half) of the quadrant into its left hand half. The corresponding short diverter baffle 69 provides a corresponding passage 72 (FIG. 3).

To avoid development of air or vapor lock in the innermost corner (near annular baffle 60, FIG. 1 center) when the hearing fluid is a liquid, each of short diverter baffles 68 and 69, and also 68a and 69a, terminates about 3 to 4 percent of the quadrant height short of baffle 60 whereby a relatively small gas escape or vent orifice 73 and 74, and also 73a and 74a, respectively is provided at each of such inner, or so-called equatorial, corners. The foregoing percentage figures for shortening the ends of the diverter baffles were used in an autoclave (of the invention) with a 54 inch axis length reaction chamber.

In the modification shows in FIGS. 1–3 and 6 (e.g. of 17 inch inside diameter reaction chamber), the single short diverter baffle, such as 68 and 69, in each quadrant is located at about midway between the full or divider baffles 65 and 66 and 65a and 66a respectively. However, in an apparatus of still larger capacity and thus correspondingly larger diameter, generally a larger odd number of diverter baffles, for example three, will be needed.

In such case, i.e. using three intermediate or diverter baffles, they would be positioned parallel to one another as well as to divider baffles 65 and 66 and at 30° angularly separated locations around the periphery of chamber wall 12. However, with the larger number they should be positioned in staggered relation as to their respective terminations short of divider baffle 60. Thus, the larger or slit-like opening (e.g. 71) will be between the upper end of the first one of the three diverter baffles and the cap, below the lower end of the second one of them and transverse baffle 60, and again between the upper end of the third one of them and the cap; thereby to promote serpentine flow of the temperature-control fluid from its entry at the inner end of shaft part 34 into the quadrant and so on through it to its egress from the quadrant and on into the inner end of the shaft part 35.

Fabricating The Apparatus

Cylindrical reaction chamber wall 12 may be prepared first. Annular baffle 60 then is fitted over wall 12 at its required location and welded in place. Then collars 14 and 16 are fitted over its open outer ends and welded at least around the annular junction of the underside of the collars with the outer surface of wall 12.

The various vertical baffles, e.g. 65, 66, 68, 69, 65a, 66a, 68a and 69a, are welded in place at their respective locations on the exterior of wall 12. Shaft parts 34 and 35 then are placed diametrically opposite one another with their respective slotted ends 62 and 63 fitted over baffle 60, and welded at their junctions with the latter and beyond the inner peripheral end of the shaft parts to the outer surface of wall 12.

Two longitudinal half sections of chamber jacket wall 28 with cut out portions large enough to allow the shaft parts to protrude and jointly to provide circular openings spaced away from their inner ends are set in place around the outer surface of upper skirt 29 and lower skirt 31 and welded together along their longitudinal junction points and peripherally at their outer ends around the outer surfaces of skirts 29 and 31.

The inner ends of nipples 46 and 51 are then inserted at their diametrically opposed openings in jacket wall 28 and welded around their peripheral junctions with the outer surface of that wall 28. Rotary unions 45 and 50 then are liquid-tightly connected to the open outer ends of inner nipples 46 and 51 respectively. Then the inner end of each of stationary T-fittings 43 and 48 also is fluid-tightly connected with the outer end of the respective one of those two rotary unions.

The inner ends of rotary unions 44 and 49 then are connected similarly respectively to the outer ends of the T-fittings. Closure caps 39 and 40, then held with the inner end of their skirt portions extended toward rotary unions 44 and 49, are slipped respectively over the outer ends of shaft-parts 34 and 35 to connect the inner ends of these skirts portions fluid-tightly separately to these rotary unions. The periphery of the orifice in the outer end of each cap, through which the outer end of the respective shaft-part still protrudes, then is welded to the shaft-part over their entire junction. Thereby the outer end of each of shaft-part jackets 37 and 38 is fluid-tightly sealed.

The thus assembled rotatable reactor-autoclave then is mounted with nipples 46 and 51 of its respectively opposed shaft-part jackets 37 and 38 seated in the pair of opposed bearings 52 and 53, and with the outer end of shaft-part 35 supported in bearing branch arm 70. Pulley 57 then is mounted and secured at the outer end of shaft-part 35 and connected by suitable belt to a driving source. Alternatively, pulley 57 may be replaced by a sprocket or gear wheel and connected by chain belt to a corresponding driving source.

In addition to their effect on the course of the temperature-control fluid through temperature-control chamber 27, the various baffles advantageously strengthen not only that chamber but also the entire body portion of the end over end rotatable materials-treating apparatus.

Continuous transverse baffle 60 and its connection with the separate shaft-parts is beneficial in the end over end roration. Additional benefit in stabilizing the rotation stems from the support given to the pulley end of shaft-part 35 by branch arm 70 of bearing 53, and also by the support to shaft-part 34 by the corresponding branch 70a of bearing 52.

The embodiment of FIGS. 1–3, used in the shortly below illustrative examples of use of the apparatus, has a reaction chamber volume of about 58 gallons, one inch separation between walls 12 and 28; one-half inch thickness of baffles and of wall 12, one inch vent gap between transverse baffle 60 and the diverter baffles and four inch long slip-gap passage between them and the inner end of the skirt of the collars; two inch diameter shaft-parts, two and three-quarters inches inside diameter of their sleeve-jackets, one-half inch thickness of the jacket walls and one-quarter inch for wall 28. The closure caps are two inches thick to withstand 500 psi, and the bolt shanks have one and a quarter inch diameter.

Method And Operation Of Apparatus

Considered broadly the important method part of the invention involves conducting under selected temperature conditions and with agitation a chemical operation which includes agitating a liquid phase and under selected temperature conditions, by enclosing whatever starting materials are involved in said operation in a liquid-tightly enclosed cylindrical operating zone by a liquid-tightly closeable zone-enclosure which enclosure is a heat conductor and has a greater axial length than diameter and is substantially completely enveloped by a temperature-control fluid-confining zone divided into a plurality of substantially equal control-fluid zonal parts; and agitating said operating zone contents by rotating said enclosed operating zone jointly with said fluid-confining zone end over end about an axis substantially perpendicular to and intersecting its longitudinal axis generally about midway between its ends, while running temperature-control fluid separately through each of said zonal parts under substantially identical flow pattern to provide substantially uniform overall indirect heat transfer between said fluid and said operating zone contents.

This method is applicable to any type of chemical operation including agitating a liquid phase under selected temperature conditions, whether the operation is merely a single step operation such as acting on one or more chemical substances, or a polymerization, or a step in a multi-step chemical procedure, for example, a chemical reaction between a plurality of substances or dissolving or otherwise dispersing one or more substances in a solvent or in a liquid vehicle as by use of some surfactant or emulsifying agent, or impregnation of a fluid (gas, vapor, or liquid) into a soft or hard solid substance, or solvent extraction or removal of a surface coating.

This method and also use of the apparatus are illustrated by, but not restricted to, the following examples, which are also part of the invention.

EXAMPLE 1

A suitable circular gasket was placed over the annular portion of cap 21 and both were liquid-tightly bolted to flange 22. Reaction chamber 11 (54 inches length and 17 inches inside diameter) was chared with the following materials in parts by weight to fill the chamber to about its full capacity:

| | | |
|---|---|---|
| styrene monomer | 40 | parts |
| stearyl methacrylate | 3 | " |

-continued

| | | |
|---|---|---|
| isobutyl methacrylate | 8 | " |
| ethyl acrylate | 3 | " |
| '360' aliphatic solvent | 30 | " |
| diacetone alcohol | 5 | " |
| 4-methoxy-4-methyl-pentanone-2 | 5 | " |
| 'Cyclosol No. 53' (Shell Oil Co.) | 5 | " |
| azo-bis-isobutyronitrile | 0.6 | part |
| benzoyl peroxide | 0.2 | " |
| trinonyl phosphite | 0.1 | " |
| di-tertiary-butyl catechol | 0.1 | " |

Top cap 17 together with a suitable gasket was liquid-tightly bolted to collar 14.

Hot water from a water heater was fed through a connecting hose (not shown) to inlet branch 42 of T-fitting 43 at a temperature to provide to the reaction chamber contents a temperature of 155°F., with the reactor rotating at 3.5 revolutions per minute. The water flowed through shaft-part sleeve 37 around shaft part 34 to the ingress to temperature-control liquid chamber 27 at the inner end of nipple 46. There it divided into four separate streams, one flowing into each of the four different quadrants of chamber 27 wherein each stream followed in its quadrant a course such that now to be described in relation to the upper quadrant of the apparatus as viewed in FIG. 1.

The bulk of the hot water flowed inwardly along the upper surface of baffle 60 and upwardly between the opposed surfaces of divider baffle 65 and diverter baffle 68 and then flowed around the outer end of baffle 68 through passage 71 and into and through the portion of that quadrant between the opposed surface of diverter baffle 68 and divider baffle 66.

At the same time, a considerably smaller portion of the water in the initial part of the quadrant ran transversely and in part along the surface of transverse baffle 60 and on through escape orifice 73 into the second part of the quadrant, and there mingled with the water flowing toward baffle 60, and then out with it into the dishcarge space between shaft part 35 and sleeve 38, and out through outlet branch 47 of T-fitting 48 and through a connecting discharge return flow hose to the water heater (both not shown).

As the apparatus was rotating during this just described flow pattern of the heating water through the upper quadrant of the apparatus (as seen in FIG. 1), each of the other three streams of the incoming heating water flowing at the same time into its respective one of the other three quadrants followed a like pattern through the two separate parts of its quadrant, and on to discharge from it about the inner end of shaft part 35, through the discharge passage around that shaft part to outlet branch 47 of T-fitting 48 and on to the water heater.

Rotation of the reactor continued at the same rate as the hot water was supplied to maintain the reaction contents at 155°F. for 16 hours. Then the water was shut off and that rotation stopped. With the apparatus in upright position, a release valve (not shown) in the top cap was opened sufficiently (to a crack) to allow entry of air. Opening a discharge valve (not shown) in the bottom cap allowed the completed reaction mixture to run into suitable containers.

The product is a valuable resin polymer solution compatibly mixable in about one to one ratio with currently used drying oils such as tung oil and the like, singly or admixed, in the so-called over-coat varnish formulations to provide such a over-coat varnish to be applied over colored printing on papers such as on label papers. When dry, by evaporation of its solvents, this resin coating leaves over the paper a high gloss, adherent coating transparent to the various colored label printing.

EXAMPLE 2

Pigmented Suspension

The shortly above-described operation was repeated with the following changes:

The respective parts of each of the styrene monomer, stearyl methacrylate, isobutyl methacrylate, and ethyl acrylate were cut in half and the omitted quantities replaced by 27 parts of titanium oxide pigment by weight. Before charging the various chemical substances into the apparatus, a layer of ball mill flint pebbles (about three-quarter inch diameter size) were loaded into it to a depth of about six inches.

The operation then was repeated as described above with end over end rotation for 12 hours. The product obtained at the end of that time was a very stable coating composition with exceptional spreadability, hiding power and covering; excellent adhesion, advantageous salt-spray resistance, and unusual dispersion in spite of its being ready for use without having been subjected to any kind of paint grinding mill treatment.

Modification Of Apparatus

Instead of constructing the rotatable ball mill autoclave with a collar and removable cap at each end (as in FIGS. 1–3), it is built with each of reaction chamber wall 12 and temperature-control fluid chamber wall 28 respectively having an integral rounded head as shown in FIG. 6. In this modification, the respective members of each of the pairs of vertical divider baffles 65 and 66 and 65a and 66a are continuous and unitary with one another in each pair. However, each of the diverter baffles, as 68, 69, 68a and 69a, still has its outer end spaced away from the continuous divider baffle to retain the slot-shaped passages 71 and 72, and also is spaced away from baffle 60 to provide the escape orifices 73 and 74; and if each quadrant has more than one diverter baffle, they are staggered as earlier described to provide serpentine flow.

Both ends of the rotary autoclave can be made with such integral dished head at the outer ends of reactor chamber wall 12 as well as of chamber jacket wall 28. Also, the jacketed head at either end or both ends can be made with an openable or removable liquid-tightly closeable manhole (not shown), and with a pressure release valve as well as a safety valve and/or a liquid or free-flowing finely divided solids inlet valve and corresponding liquid or fluid mixture outlet valve in the other head.

In some uses of the rotatable autoclave and/or ball mill of the invention, is may be necessary during the operation at high pressure and while rotating, to feed into the reaction chamber an additional reactant at some particular stage of the operation. That can be done by modifying one of the shaft parts, for example, 34 (as in FIG. 4), by providing in it a liquid passage bore 75 extending co-axially centrally through it from its outer end to, and with its inner end extending through and terminating at, the inner surface of the reaction chamber wall 12 to communicate with chamber 11.

In that case, the bore terminates at its outer end in a fitting pressure-tightly connected with a rotary, i.e., rotatable union or joint connected to a feed line bringing in under pressure the reagent to be added. The inner end of bore 75 is fitted with a ball check valve with its valve seat 76, sealing ball 77 biased against the spring and so on valve nut 78 having one or more sluice-ways 79 inclining inwardly into the inlet end of bore 75, through which the reactant can enter reaction chamber 11.

Upon supplying the reagent under a pressure greater than that in chamber 11 thereby ball 77 is forced away from its seat to compress the spring and allow the reactant to pass on into the reaction chamber. When the needed quantity of reactant has been added, closing a feed valve (not shown) in its supply line and opening a release valve (not shown) between the feed valve and bore 75 allows ball 77 to be forced back by the spring as well as the pressure in reaction chamber 11 to its seat to close the ball check valve.

Tool-engaging slots 81 and 82, in valve seat 76 and valve nut 78 respectively, enable engaging and removing each of them with a tool for that use to allow cleaning out the check valve and, when necessary, bore 75.

The means for feeding temperature-control fluid to, and for its egress from, the separate compartments of the temperature-control fluid chamber of the embodiment of FIGS. 1–3, 5 and 6 can be modified by replacing shaft part 34 and its surrounding temperature-control sleeve 37 simply by the advantageous combination of a hollow shaft part 91 and a rotary (i.e., rotatable) joint 92 (as in FIGS. 7 and 9), and doing likewise as to shaft part 35 and its sleeve 38. As each such replacement is the same as the other, their details can be described by reference to one of them as shown in those figures.

In them, the inner end of hollow shaft part 91 extends snugly through a peripherally fitting opening in fluid chamber wall 28 to, and it integrally attached (as by welding) to, the outer surface of reaction chamber wall 12. Wall 28 is fluid-tightly sealed (as by welding) around its peripheral contact with shaft part 91. The latter is hollow by having a central bore 83 (e.g., of 1 inch diameter in a 2 inch diameter shaft) extending longitudinally coaxially through it from its outer end to its inner end part within chamber 27.

Figure 8:
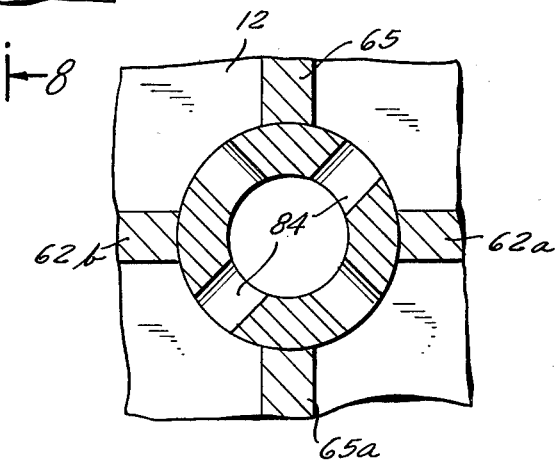
FIG. 8 is a vertical section along the line 8—8 of FIG. 7, looking in the direction of the arrows.

There bore 83 communicates with each quadrant of chamber 27 through a suitably sized circular orifice 84 (e.g., 0.5 inch diameter) to enable the respective portion of the temperature-control fluid to flow into its own quadrant. The central axis of each of such four orifices can lie on a line 45% from the vertical. The inner end of each shaft part can be slotted as at 62 and 63 of FIG. 1, or can terminate butt end against wall 12 with the peripheral baffle 60 cut into two separate parts 62a and 62b (as seen in FIG. 8).

The outer end of bore 83 is threaded to receive in fluid-tight registry the external threads at the outer end of the bore-engaging nipple 85 of rotary joint 92 whose fluid intake 80 is connected (in manner similar to fluid inlet 42 of T-fitting 43 of FIG. 1).

In manner to that described for the temperature-control fluid flow through the emdobiment shown in FIG. 1, the fluid leaving chamber 27 enters the corresponding orifices into the bore of a diametrically opposed like combination of hollow shaft part and rotary joint and leaves its fluid outlet, for example, to return to a fluid heater.

Any suitable fluid-tight joint 92 can be used such as that available over the past 15 years as the Phillips EXACTO flexible rotary joint, packless and self-lubricated, produced by Phillips Company, Inc., of Ridgefield, New Jersey, and shown in gray on the front of their single sheet two page technical description (with red background for the upper half of its front page and black for its lower half).

Figure 7:
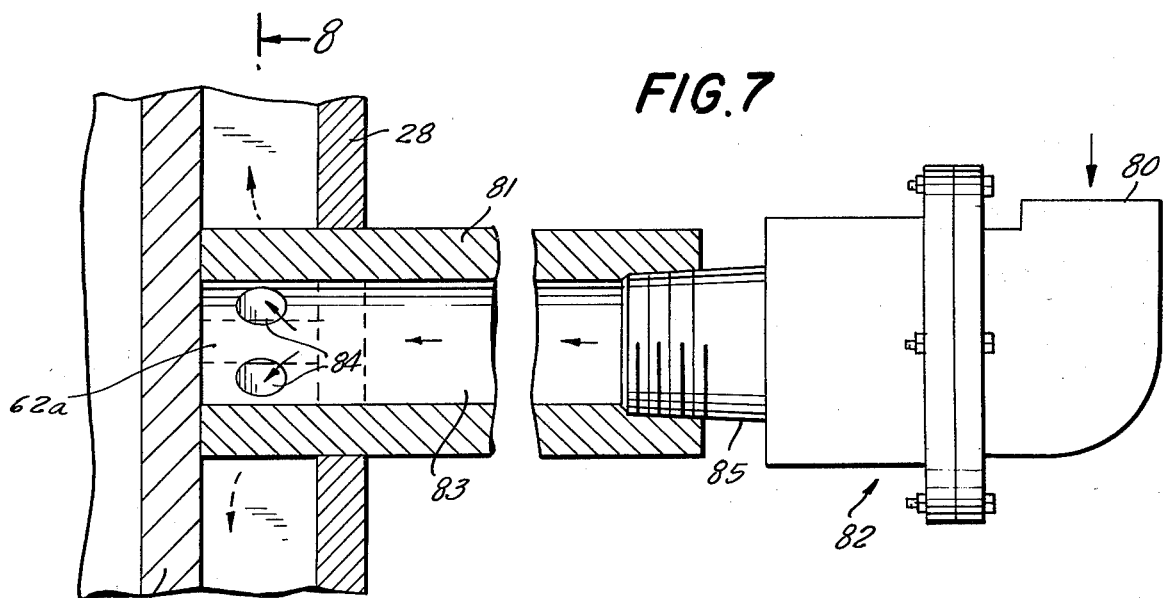
FIG. 7 is a fragmentary vertical section through one side of the shaft and its contiguous part of heat-control fluid jacket, showing another embodiment having a heat-control fluid conduit running through the shaft.
Figure 9:
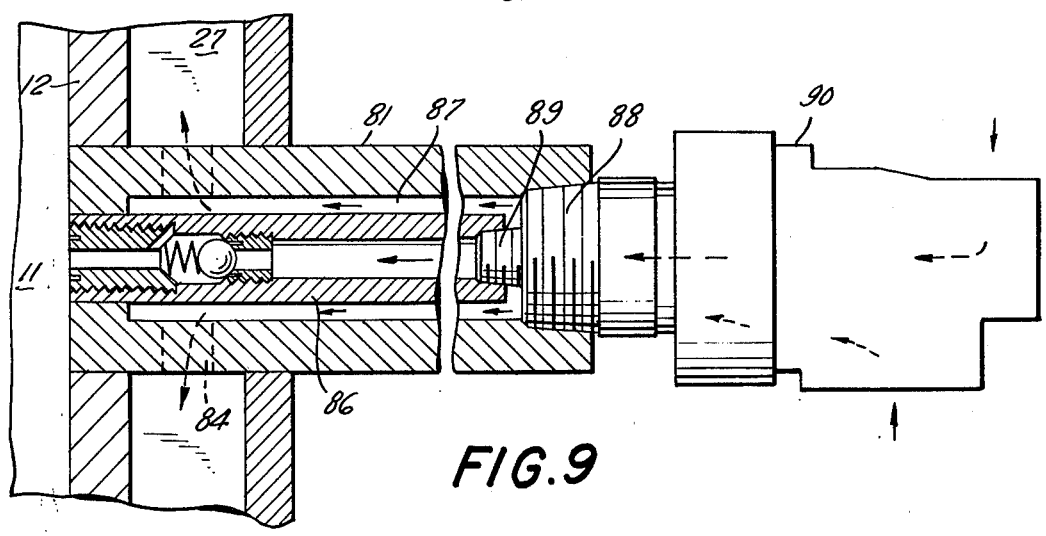
FIG. 9 is a view like FIG. 7 and including a fluid material conduit concentrically running through heat-control fluid conduit and communicating with the interior of the reaction chamber.

The hollow shaft parts of FIGS. 7 and 8 can be combined with means as shown in FIG. 4 for feeding fluid material into reaction chamber 11. Such combination is illustrated in FIG. 9. In it a fluid materials conduit 86 extends longitudinally coaxially through, and spaced away from the inner wall of hollow shaft part 91, to leave a temperature-control fluid passage 87 between them.

Fluid materials conduit 86, fitted at its inner end with a ball check valve of the same construction and operation as that shown in FIG. 4 and described earlier above, similarly communicates (FIG. 9 with similarly numbered parts as in FIG. 4) with reaction chamber 11 to allow charging fluid material into it during the materials-treating operation therein. The inner wall of the outer end of each of hollow shaft part 91 and fluid materials conduit 86 is threaded to engage respectively in fluid-tight and pressure-tight registry with corresponding concentric engaging nipples 88 and 89 of concentrically-dual-flow rotary joint 90 (shown without more detail in FIG. 9 because its details are not part of the invention).

A suitable concentrically-dual-flow rotary joint effective in the foregoing combination is seen in catalog No. 14 of Rotherm Engineering Company, Inc., of Chicago, Illinois, such as its type YX of its pages 1-2 or type AR on its page 3. The temperature-control fluid enters through the inlet for it into fluid passage 87 and on through it and orifices 84 and heat control chamber 27 and so on out of the outlet from its quadrants and through like orifices 84 into a second egress ccombination such as that of FIG. 9 and through its temperature-control fluid egres passage and on out through the outlet for it in the rotary joint.

In this second combination, the ball check valve in the inner end of the equivalent of the fluid materials conduit is modified so that the ball seat is between the ball and reaction chamber 11 and the spring in next beyond the ball in a direction away from the chamber.

Thereby that conduit enables withdrawing reaction material from reactor chamber 11 at any point during the reaction period from the second outlet of the concentrically-dual-flow rotary joint, by proper sequential operation of hand operated valves (not shown) exterior of that second outlet.

The apparatus of the invention can be made of ordinary high pressure-withstanding steel for all of its uses except those where contact with steel and any of its constituents at the operating temperature and conditions adversely affects the reaction products. For such uses reaction chamber wall 12 and the caps, whether removable or integral, can be made of stainless steel or be lined with it or some other suitable metal which does not adversely affect the materials being treated.

While the temperature-control fluid chamber of the fully described illustrative embodiment of the end over end rotatable reactor of the invention advantageously is divided into four similar quadrants, the apparatus can be made with some other plurality of, even two, such substantially alike divisions or compartments of the control fluid chamber, so long as there is the same number of them above and below transverse or annular baffle 60, and an adequate arrangement of diverter baffles is used.

For example, such reactor apparatus with only two like temperature-control fluid chambers lacks the vertical baffles 65, 65a, 66 and 66a, but includes the diverter baffles 68, 68a, 69 and 69a.

It is advantageous as to the empty but closed apparatus, that its two halves resulting from dividing it by a plane running through the axis of its end over end rotation and the middle (of the thickness) of annular transverse baffle 60 be substantially equal in weight.

Grinding Use In Reactor, And Varying Temperature

Many reactions using the apparatus as an autoclave can be carried out without including any ball mill-type metal balls or flint pebbles or stones such as used in Example 2 above, showing preparation of a pigmented polymer resin solution. While many reactions thus can be carried out without them, including grinding balls or flints is highly beneficial and advantageous where disaggregated solid materials are used, for example, for dispersing them in solvent or other liquid vehicles.

The result is that such solid materials then not only readily are more finely divided so that they more readily are dissolved if they are soluble and need to be dissolved in the vehicle, or are more readily and very stably dispersed in the vehicle if insoluble in it; and that occurs unexpectedly in an inordinately shorter time than is possible in a ball mill rotating about its usual longitudinally central axis or in grinding mills.

After conducting any operation in the apparatus at elevated temperature, and so also at elevated pressure, or it a reaction requires cooling at some intermediate stage, the hot water or oil or steam supply to the temperature control fluid inlet 42 can be replaced by feeding cooling or cold water to it. That is done by suitable valve adjustments (not shown) ahead of inlet 42 to enable switching from the hot fluid supply source to the cooling or cold water supply source. In that way after completing a run, the pressure in the reaction can be reduced to a suitable lower level or retained at some adequate level, for example, if desired to assist in discharging the contents which in turn can be cooled to any desired discharge temperature.

Such possibility of cooling the reaction chamber is further advantageous by enabling using the apparatus as a ball mill for disintegrating and finely dividing materials which cannot be treated thus at ambient temperature, but which are suitably frangible and non-adherent when cooled to some adequate temperature below ambient.

While the pigmented suspension in Example 2 shows the reduction in size of its titanium dioxide pigment, that same pigment likewise can be reduced in size in other polymerization systems or other liquid systems. Other pigments likewise can be reduced in size in that specific or other polymerization systems or other liquid systems. other solid particles in fluid systems, for example, solid absorbing agents such as carbon black, or catalyst particles, similarly can be reduced in size either to provide additional contact surface or to present fresh surface such as fresh catalyst surfaces during the course of a catalyzed reaction.

Catalyst Grinding As For Ziegler Polymerization

A good example of the latter is the polymerization of ethylene or propylene or other 1-alkenes by the well known Ziegler process employing the multi-component stereospecific catalysts, usually the chemical complexes derived from a transition metal halide such as a titanium halide as titanium trichloride and tetrachloride, and a metal hydride or metal alkyl or metal alkyl halide, such as the Ziegler catalyst combinations. These are more fully described in The Condensed Chemical Dictionary, 7th edition (1966), Reinhold Publishing Corporation, New York, N.Y. pages 1030–1031.

Thus, the polymerization of ethylene or that of polyethylene or other 1-alkene by the Ziegler process can be carried out in the presence of a Ziegler composition, including its solid components such as amorphous titanium trichloride and aluminum trichloride or an aluminum mono(lower)alkyl dihalide as aluminum methyl dichloride or ethyl dichloride. That Ziegler polymerization can be conducted by the method, and in the apparatus, of this invention using a suitable quantity of compatible steel balls or ceramic or equivalent ball mill stones (as in the pigmented suspension Example 2 above), and even at atmospheric pressure.

Rotation of the reactor causes the balls or stones to drop and by their impact on striking the solid catalyst particles to reduce their size to provide fresh active surfaces for enhanced and continuing catalytic activity. An example of the Ziegler polymerization process using a three-component Ziegler catalyst composition occurs in the James L. Jezl, Habet M. Khelghatian, and Louise D. Hague U.S. patent application Ser. No. 106,487 filed May 1, 1961.

Other Chemical Operations In The Reactor

Still other chemical operations that include agitation and selected temperature conditions are illustrated by, but not restricted to, the following examples:

EXAMPLE 3

Figure 2:
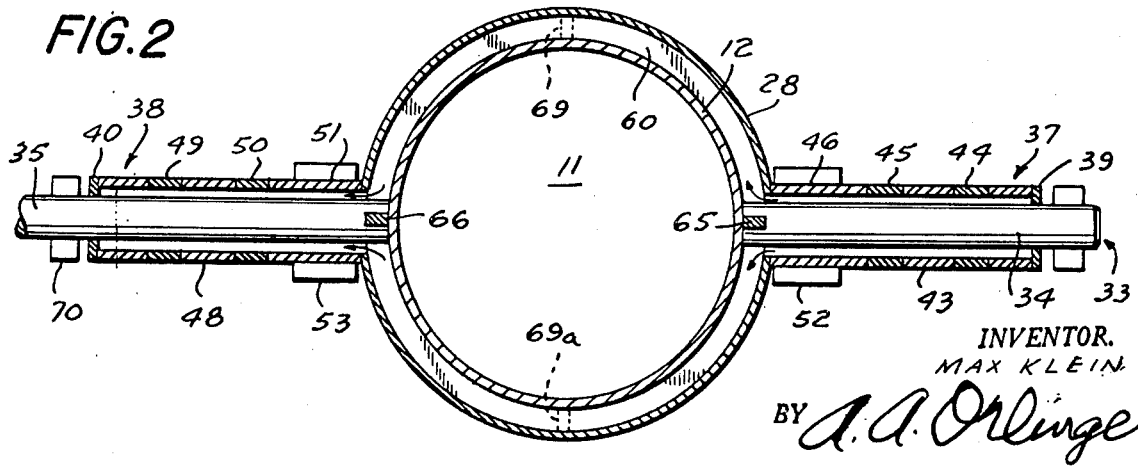
FIG. 2 is a horizontal sectional view taken normally transverse to the central axis of FIG. 1 and along line 2—2 looking in the direction of the arrows.

Aqueous Suspending Agent Solution 24 pounds each of (i) the higher viscosity hydroxyethylcellulose ('Cellosize 4400'H grade, of Union Carbide Corporation, New York, N.Y.), a 2% (by weight, dry basis) aqueous solution of which at 20°C. has a Hoopler viscosity of 6175 to 7600 centipoises and corresponding Brookfield viscosity at about 25°C. of 4700 to 5200 with spindle No. 4 at 60 r.p.m., dissolved in water, for example, to at least about one percent by weight, and (ii) the lower viscosity hydroxyethylcellulose ('Cellosize WPO9' H grade of Union Carbide Corporation) whose 5% (by weight, dry basis) aqueous solution shows a Hoopler viscosity of 120 to 160 centipoises at 20°C. and corresponding Brookfield viscosity of 100 to 140 centipoises at about 25°C. with spindle No. 1 at r.p.m., and also of (iii) dimethylformamide were added to 570 gallons of tap water in a 600 gallon reactor (as shown in FIGS. 1, 2 and 3, with its central axis 3 times its diameter) rotated at 10 r.p.m. while running hot water through its jacket to maintain the reactor content at 170°F. for 1 hour. The resulting aqueous solution was allowed to cool and set aside as a stock aqueous suspending agent solution for use in separate portions as needed.

Any suspending agent solution or dispersion can be prepared similarly.

EXAMPLE 4

Suspension Polymerization Producing Polystyrene 100 pounds of the stock aqueous suspending agent solution of Example 3 was admixed with 200 pounds of tap water in the same reactor as used in Example 3. To the thus diluted aqueous suspending agent solution was added 50 pounds of sytrene monomer containing dissolved in it 80 grams of alpha, alpha'-azobisisobutyronitrile, 10 grams of benzoyl peroxide, and 100 grams of polystyrene lubricant brand mineral oil Sufficient additional water was added to raise the liquid level in the upright open reactor to about its top. The reactor was fluid-tightly sealed and immersed in a bath that provided a polymerization temperature of 157°F. while the reactor was rotated at 3 r.p.m. for a time sufficient for the reaction to be completed. That usually is at least about 12 to 15 hours, but conveniently was run overnight to a total off approximately 18. It can be run overnight for even about 20 hours because no harm results from any extra time.

After the run was completed, one end cap of the reactor was unbolted. The reactor was rotated a little over a quarter revolution and its contents emptied into a screen which retained the polystyrene spheres and on which they are washed with tap water after the aqueous suspension vehicle drained off, and dried. The resulting polystyrene spheres ran in a diameter from one thirty-second up to about one-quarter inch.

Any other polymerization which is to be, or can be, conducted in aqueous or other suspension form, or in solution in suitable solvent or mixed solvents, with agitation and at selected temperature conditions can be carried out in a reactor apparatus of the invention of suitable volume capacity.

Attempts to copolymerize styrene and acrylonitrile by solution polymerization yielded undesirably low viscosity polymer solutions giving weak and brittle films cast from them. This was overcome by copolymerizing these monomers as in the following method:

EXAMPLE 5

Solution Co-polymerization Of Styrene And Acrylonitrile 120 ml. of styrene, 28 ml. of acrylonitrile, 200 ml. of methyl ethyl ketone, 180 ml. of xylene, 3 ml. of tricresyl phosphate, and 3 ml. of butyl benzyl phtallate were mixed in a liter beaker, and into their mixture 0.6 gram of alpha, alpha'-azo-bis-isobutyronitrile and 0.2 gram of benzoyl peroxide were uniformly admixed.

Seven grams of the finely divided equimolar acid addition salt product of rapidly mixing separate streams of equimolar amounts of methacrylic acid and 2-(mono)tertiary-butylaminoethyl methacrylate poured rapidly into a mixing vessel in less than 10 seconds annd promptly pouring their mixture into a crystallizing pan wherein they solidified to a tough opaque mass, all in overall total time of 10 seconds (as described in Example 1 of my copending application Ser. No. 15,935 and incorporated herein by reference) were placed in a stainless steel reactor as shown in FIGS. 1, 2 and 3 (with longitudinal axis about 3 times its diameter), to which was added 225 ml. of the just described solution of the monomers styrene and acrylonitrile in the solvents methyl ethyl ketone and xylene, with the included phosphate and phthallate plasticizers and the nitrile and peroxide catalyst.

The reactor was sealed with its cap screwed pressure-tightly over the outside threads of its neck with a Teflon(tetrafluroethylene polymer resin)-tape seal between the cap and the threads. The reactor was rotated about its own axis and heated by indirect heat exchange by water maintained at 160°F., for 16 hours to obtain substantially complete conversion.

The resulting styrene-acrylonitrile copolymer solution in the methyl ethyl ketone and zylene is a transparently clear coating lacquer. Application of single coatings of this lacquer over metal surfaces, especially non-ferrous metals as copper, brass, bronze, as well as over iron, steel and ferrous metal surfaces, after evaporation of the solvents and without subsequent baking, left them with a strongly adhesive clear transparent continuous thin film which protected and preserved their bright clean original surfaces from atmospheric change for long extended periods even over five years as with the copper.

Illustrative of the polymerization of material other than those of styrene monomer, but in no way restrictive, is the following example:

EXAMPLE 6

Polymerization Produce Of Equimolar Acid Addition Salt

Thirty-six parts of the equimolar acid addition salt of methacrylic acid and 2-(mono-tertiary-butylamino)ethyl methacrylate as prepared in Example 5, and 115 parts of pentane, together with 0.2 part of alpha,alpha'-azo-bis-isobutyronitrile as catalyst were loaded into a reactor apparatus of the invention as used in Example 5. The reactor was rotated at 12 r.p.m. and hot water was run through its jacket to bring the reactor content to 150°F. The heating and the rotations were continued with that temperature until the polymerization was complete at the end of a 24 hour cycle at 150°F.

This equimolar acid addition salt polymer formed as a very finely divided white solid suspension in the pentane, in which it was insoluble. This polymer easily was filtered off from the pentane and dried readily at room temperature and pressure as the adhering pentane evaporated off, leaving behind the extremely fine polymeric product.

Use of the method of the invention in still a different kind of chemical operation, namely, an impregnation, involving agitation at selected temperature conditions is illustrated by, but not restricted to, the following example:

EXAMPLE 7

Impregnation Of Polystyrene Pellets To Provide Expandable Polystyrene 46 gallons (391 pounds) of water were charged into a 58 gallon stainless steel reactor apparatus as shown in FIGS. 1, 2 and 3 (having a longitudinal axis about three times its diameter). To the water there was added one pound of the "Gafac RE 610" anionic emulsifying agent, a phosphate ester of an ethoxylated alkyl phenol and composed of about equal parts of the mono- and di-ester and a maximum of up to 5% of nonionic component (product of General Aniline and Film Corporation, New York, N.Y., according to their patents 3,004,056 and 3,004,057); and a catalytic redox mixture of 25 grams of potassium persulfate and 10 grams of sodium bisulfite, with which mixture was included 10 grams of sodium pyrophosphate.

Into that aqueous mixture there was charged 100 pounds of general purpose molding polystyrene pellets (3 millimeters size). More water was added to adjust the liquid level to leave sufficient room only for the addition of seven pounds of pentane, so that upon adding it the vessel was full to capacity. The impregnator then was pressure-tightly sealed by tightly bolting on its flat top cap over an intermediate gasket resistant to those liquids and their vapors.

The impregnator then was rotated at 4 r.p.m. (thereby agitating the polystyrene pellets) while hot water was circulated through the impregnator jacket to bring the temperature of the contents to 195°F. The heating was continued to keep the contents at that temperature for about 30 minutes. Then cooling water was circulated through the jacket to lower the temperature of the contents rapidly to about 100°F.

Rotation then was stopped, the impregnator opened and its contents discharged through a screen to let the water drain off, leaving behind the wholly free running, non-agglomerated pentane-impregnated pellets. These were rinsed lightly with tepid water to remove merely the water-soluble substances in the adhering suspending water, and then were air draft dried. A three gram sample of the thus dried impregnated pellets occupied about 4.5 milliliters whereas 3 grams of them expanded by heating in boiling water for one minute, after draining off the water, occupied 100 milliliters.

Any other styrene-polymer can be impregnated similarly, as can also any other plastic or other material that is to be impregnated or leached and which physically can be handled in the reactor apparatus of the invention. In addition to any such impregnation or any leaching operation, the method of the invention can be carried out in its reactor apparatus to remove surface coatings from surfaces inert to the solvent or other chemical reagents needed in removing the coating.

In the latter chemical operation, the removable cap embodiment of the invention (FIGS. 1   3) is advantageous particularly for treating large bulky materials. For example, there is a vast quantity of waste synthetic polymer insulation-coated copper electric wire, the recovery of the commercially valuable copper from which presents serious problems and extensive losses. That is particularly so, for example, with such copper wire insulated with polyvinyl chloride.

Recovering the copper from such insulated wire has been tried by burning off the polyvinyl chloride insulation. However, that presents not only a serious recovery plant equipment corrosion problem caused by the evolved hydrochloric acid resulting from burning the polyvinyl chloride insulation, but also a community air pollution problem with the hydrogen chloride gas contaminating the atmosphere, and also yields a heavily carbon-coated copper from decomposition of the insulation by burning.

The end over end rotatable autoclave apparatus of the invention advantageously allows avoiding all of those difficulties and provides fully clean copper bringing top market price, as well as a solution of the polyvinyl chloride in the solvent for it, from which the solvent can be distilled off and recovered, leaving behind reuseable polyvinyl chloride. That presents an unobvious method using operating conditions provided by the herein novel apparatus.

That method of removing a surface coating includes for example, in removing polyvinyl chloride insulation from copper wire, loading coils of so insulated copper wire into, say, the 58 gallon capacity material-treating autoclave (of FIGS. 1–3), adding a sufficient quantity of a suitable solvent for the insulation, sealing the apparatus fluid-tightly, and rotating it, for example, at 3.5 revolutions per minute at a sufficient elevated temperature and for a sufficient time to dissolve the insulation; then preferably cooling the mixture down merely to a suitable convenient handling lower temperature, draining out the solution of the insulation; adding the smaller amount possibly up to one-quarter of that used for dissolving the insulation, sufficient to rinse the copper, drawing off the rinse solution (also through the discharge valve in one of the end caps) for use with a further run; and then unbolting one of the end caps and allowing the completely cleaned copper to side out of the open end. The foregoing procedure is illustrated thus, but not restricted by it:

EXAMPLE 8

Three hundred pounds of polyvinyl chloride insulated copper wire of 26 gauge were loaded into that reactor autoclave. For a solvent a mixture of 15 gallons of tetrahydrofuran and 25 gallons of methyl ethyl ketone were poured in, and the closure cap and its gasket fluid-tightly bolted in place. The reactor was rotated at 3.5 r.p.m. while heating water was fed through inlet 42 at a temperature of 160°F., and the apparatus rotated at the temperature for 2 hours.

Rotation then was stopped, and the solution of the polyvinyl chloride insulation in the mixed solvents was run off to a recovery still. The autoclave then was rotated part of a turn sufficient to allow adding, through the same valve, through which the prior solution was drained off, 5 gallons each of tetrahydrofuran and of methyl ethyl ketone (for rinsing). After closing the valve, the autoclave was rotated again at the same rate for 15 minutes, when cool water was circulated through its quadrants to reduce the pressure and temperature to a comfortable handling level.

The rotation then was stopped and the rinse solvent solution drawn off to storage. One of the end caps then was unbolted and the clean copper wire was slid out of the inclined autoclave, and allowed to dry from its residual heat. The solution of the dissolved polyvinyl chloride insulation in the mixed solvents, in the still, was distilled to drive off the solvents which were recovered. The polyvinyl chloride remained as a residue for sale and use in applications that could be made with it.

Other synthetic polymer insulations can be removed from other such waste copper or other wire of any gauge such as that 26 gauge and up to 4 gauge by similar procedure with suitable recoverable solvent for the particular insulation which likewise also can be recovered as a separate product for use as could be made of it.

In addition to the various specific examples, the method of the invention can be used in carrying out any other chemical operation, whether a chemical treatment or reaction, that has to be agitated under selected temperature conditions and at ambient atmospheric or other pressure. That is so also whether the treatment is to be carried out in solution form or in emulsion or liquid suspension vehicle or reaction medium, or whether including disintegrating and/or finely dividing in a liquid system a frangible material such as adsorbing agents, catalysts, liquid-soluble dyestuffs, and insoluble pigments; so long as the treatment or reaction physically can be conducted in the rotary reactor/autoclave apparatus of the invention. Chemical synthesis is included in chemical reaction. The expression "chemical operation" is used generically to embrace all of these various treatments or reactions as described in this paragraph and elsewhere in this disclosure and as illustrated, but not restricted to, the various specific examples.

By "body portion" of the apparatus is meant that part of it excluding the closure caps and any part of the collars exposed outside of wall 28 of the embodiment of FIGS. 1–3 and all of the embodiments represented by them when modified by the dished end of FIG. 6 excluding any valves in any manhole covers.

Various other substitutions and modifications can be made in any of the hereinabove described apparatus and method embodiments of the invention and individual parts of either or them, within the scope of the appended claims, and which are intended also to cover equivalents of any of the specific embodiments.

What is claimed is:

1. The method of conducting under selected temperature conditions and with agitation a chemical operation which includes agitating a liquid phase under selected temperature conditions, which method comprises enclosing whatever starting materials are involved in the selected operation, which includes agitating a liquid phase under selected temperature conditions, in a liquid-tightly enclosed cylindrical operating zone by a liquid-tightly closeable zone-enclosure which enclosure is a heat conductor and has a greater axial length than diameter and is substantially completely enveloped by a temperature-control fluid-confining zone divided into a plurality of substantially equal control-fluid zonal parts; and agitating said operating zone contents by rotating said enclosed operating zone jointly with said fluid-confining zone end over end about an axis substantially perpendicular to and intersecting its longitudinal axis generally about midway between its ends, while running temperature-control fluid separately through each of said zonal parts under substantially identical flow pattern to provide substantially uniform overall indirect heat transfer between the temperature-control fluid and said operating zone contents.

2. The method as claimed in claim 1, wherein the starting materials involved in it comprise polyvinyl chloride insulation covered copper wire and an organic solvent for said insulation in an amount sufficient to dissolve said insulation, and the operating zone is rotated end over end for a time sufficient to dissolve the insulation from said wire at a temperature below that at which the polyvinyl chloride is degraded.

3. The method of conducting a polymerization under selected temperature conditions and with agitation, which method comprises enclosing the polymerization starting materials including at least one fluid polymerizable monomer and a polymerization catalytically effective amount of a compatible catalyst effective for the polymerization of the monomer, in a liquid tightly-enclosed cylindrical operating zone by a liquid-tightly closeable zone-enclosure which enclosure is a heat conductor and has a greater axial length than diameter and is substantially completely enveloped by a temperature-control fluid-confining zone divided into a plurality of substantially equal control-fluid zonal parts; and agitating said operating zone contents by rotating said enclosed operating zone jointly with said fluid-confining zone end over end about an axis substantially perpendicular to and intersecting its longitudinal axis generally about midway between its ends, while running temperature-control fluid separately through each of said zonal parts under substantially identical flow pattern to provide substantially uniform overall indirect heat transfer between the temperature-control fluid and said operating zone contents.

4. The method as claimed in claim 3, wherein said starting materials include also a sufficient quantity of a compatible pigment to provide a desired color to the end product polymer, and there is included in the operating zone a sufficient quantity of compatible ball mill grinding balls which by their impact on falling on the pigment during the end over end rotation of said operating zone reduce the size of the starting pigment.

5. The method as claimed in claim 3, wherein the major part of the material to be polymerized in styrene monomer.

6. The method as claimed in claim 3, wherein the polymerization is an addition polymerization wherein a free radical is involved or is the type which depends on the presence of a Ziegler polymerization catalyst.

7. The method as claimed in claim 5, wherein the polymerization is that of producing polyethylene or polypropylene.

8. The method as claimed in claim 6, wherein a Ziegler polymerization catalyst is present and ball mill grinding balls are included in the operating zone in order by their impact on striking the solid catalyst particles to reduce their size or to present fresh surface of these particles.

* * * * *